(12) United States Patent
Shmulevich

(10) Patent No.: US 9,392,865 B2
(45) Date of Patent: Jul. 19, 2016

(54) ELECTRONIC DEVICE THEFT PREVENTION ASSEMBLY

(71) Applicant: Sigal Shmulevich, Glen Cove, NY (US)

(72) Inventor: Sigal Shmulevich, Glen Cove, NY (US)

(*) Notice: Subject to any disclaimer, the term of this patent is extended or adjusted under 35 U.S.C. 154(b) by 0 days.

(21) Appl. No.: 14/560,093

(22) Filed: Dec. 4, 2014

(65) Prior Publication Data
US 2016/0157592 A1 Jun. 9, 2016

(51) Int. Cl.
*A45F 5/00* (2006.01)
*A45F 5/10* (2006.01)

(52) U.S. Cl.
CPC .......................... *A45F 5/10* (2013.01)

(58) Field of Classification Search
CPC ............... A45F 5/00; A45F 2200/05; A45F 2200/0508; A45F 2005/008; A45F 2200/0516; A45F 2200/0525; A45F 5/10; A45C 11/00
USPC ............ 294/25, 137, 139, 215, 197; 224/217, 224/218, 930; 248/682, 688; 361/679.56; 401/8; 455/575.8
See application file for complete search history.

(56) References Cited

U.S. PATENT DOCUMENTS

| 7,286,803 | B2 | 10/2007 | Hamasaki et al. | |
|---|---|---|---|---|
| 7,661,567 | B2 * | 2/2010 | Myers | A45C 13/20 224/162 |
| D641,154 | S | 7/2011 | Smith | |
| 8,374,657 | B2 | 2/2013 | Interdonato | |
| 8,483,786 | B2 * | 7/2013 | Ramies | B67B 7/16 455/550.1 |
| 8,522,965 | B1 * | 9/2013 | Hsiung | B65D 25/24 206/320 |
| 8,528,798 | B2 | 9/2013 | Chen | |
| 8,548,536 | B1 * | 10/2013 | Gunnip | H04M 1/04 248/585 |
| 8,550,317 | B2 | 10/2013 | Hyseni | |
| 8,950,638 | B2 * | 2/2015 | Wangercyn, Jr. | H04B 1/385 224/217 |
| 2006/0279098 | A1 | 12/2006 | Shipley | |
| 2009/0090750 | A1 * | 4/2009 | Alcenat | A45F 5/00 224/101 |
| 2009/0270050 | A1 | 10/2009 | Brown | |
| 2011/0084081 | A1 * | 4/2011 | Chung | A45C 11/00 220/628 |
| 2012/0031937 | A1 | 2/2012 | Baker | |
| 2013/0279098 | A1 * | 10/2013 | Cho | H05K 7/00 361/679.01 |
| 2014/0027482 | A1 * | 1/2014 | Crawford | A45F 5/102 224/197 |
| 2015/0084356 | A1 * | 3/2015 | Dinh | G06F 1/16 294/25 |

FOREIGN PATENT DOCUMENTS

WO    WO 2014067230 A1 * 5/2014 ............. G06F 3/039

* cited by examiner

*Primary Examiner* — Gabriela Puig

(57) ABSTRACT

An electronic device theft prevention assembly for preventing an electronic device from being stolen includes a case that may removably receive an electronic device. The case has a front side, a back side and a perimeter edge extending therebetween. The front side is substantially open. A grip is coupled to the case. The grip may be engaged by fingers of a user such that the case is retained on the user. The grip is comprised of a flexible material.

3 Claims, 4 Drawing Sheets

ELECTRONIC DEVICE THEFT PREVENTION ASSEMBLY

BACKGROUND OF THE DISCLOSURE

Field of the Disclosure

The disclosure relates to theft prevention devices and more particularly pertains to a new theft prevention device for preventing an electronic device from being stolen.

SUMMARY OF THE DISCLOSURE

An embodiment of the disclosure meets the needs presented above by generally comprising a case that may removably receive an electronic device. The case has a front side, a back side and a perimeter edge extending therebetween. The front side is substantially open. A grip is coupled to the case. The grip may be engaged by fingers of a user such that the case is retained on the user. The grip is comprised of a flexible material.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
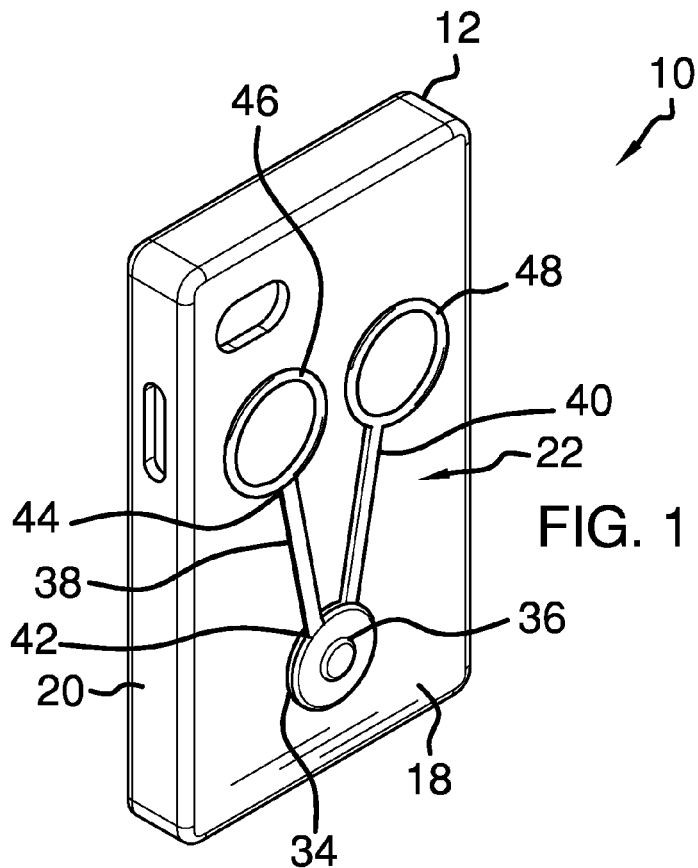
FIG. 1 is a perspective view of an electronic device theft prevention assembly according to an embodiment of the disclosure.
Figure 2:
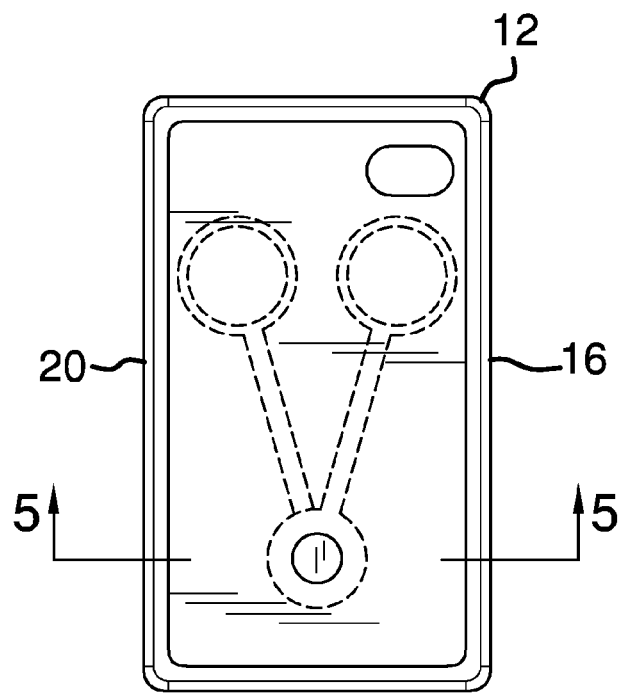
FIG. 2 is a front view of an embodiment of the disclosure.
Figure 3:
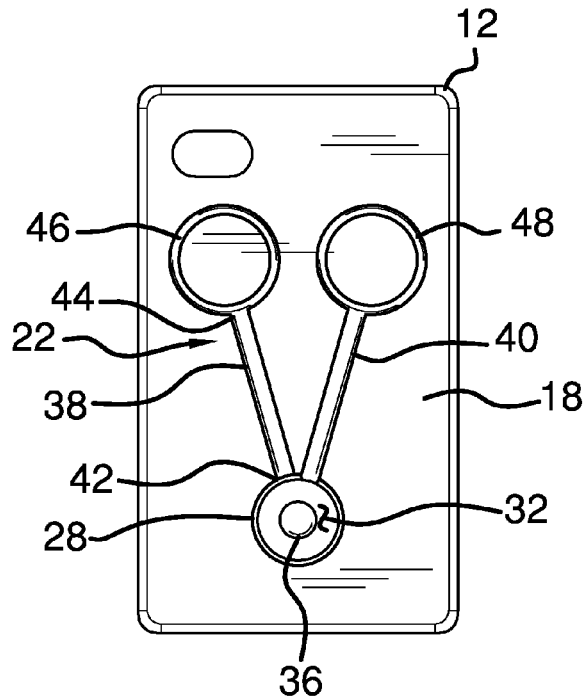
FIG. 3 is a back view of an embodiment of the disclosure.
Figure 4:
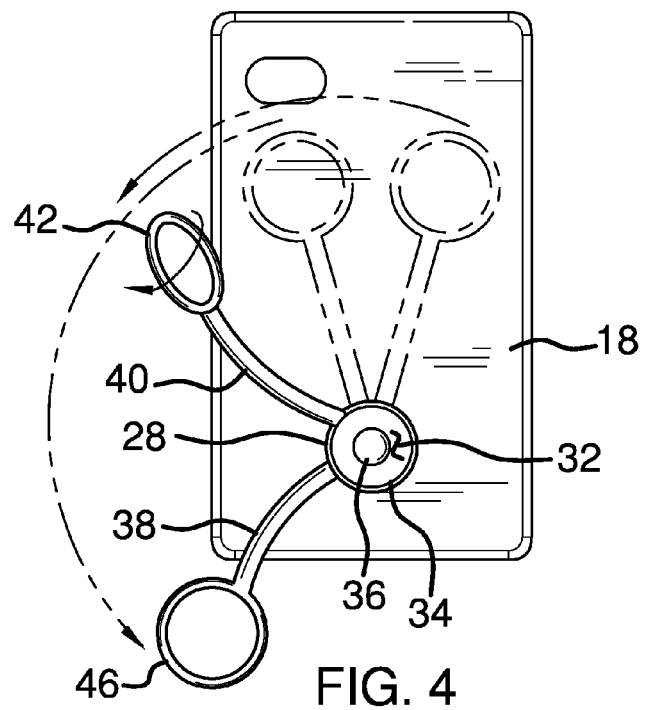
FIG. 4 is a back view of an embodiment of the disclosure showing a grip in a deflected position.
Figure 5:
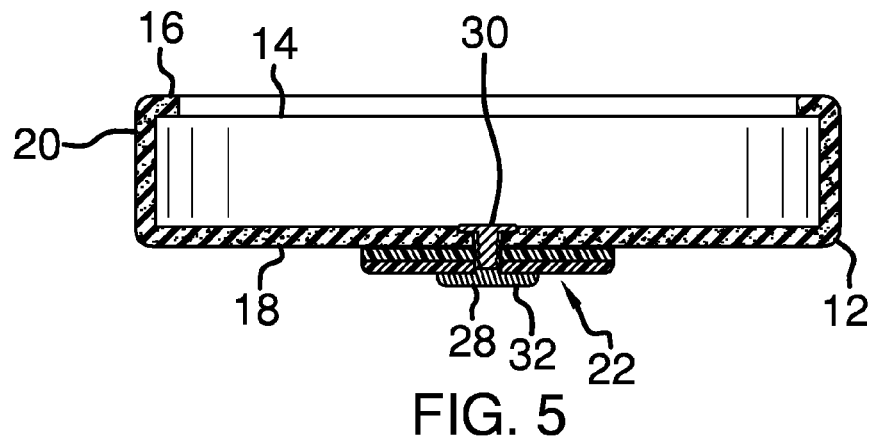
FIG. 5 is a cross sectional view taken along line 5-5 of FIG. 2 of an embodiment of the disclosure.
Figure 6:
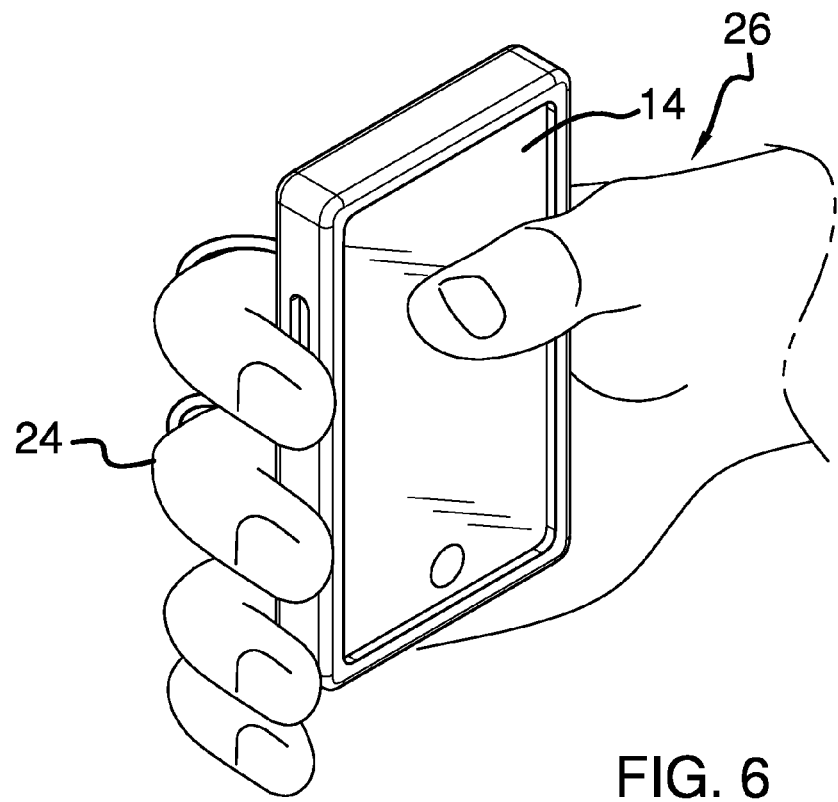
FIG. 6 is a front in-use view of an embodiment of the disclosure.
Figure 7:
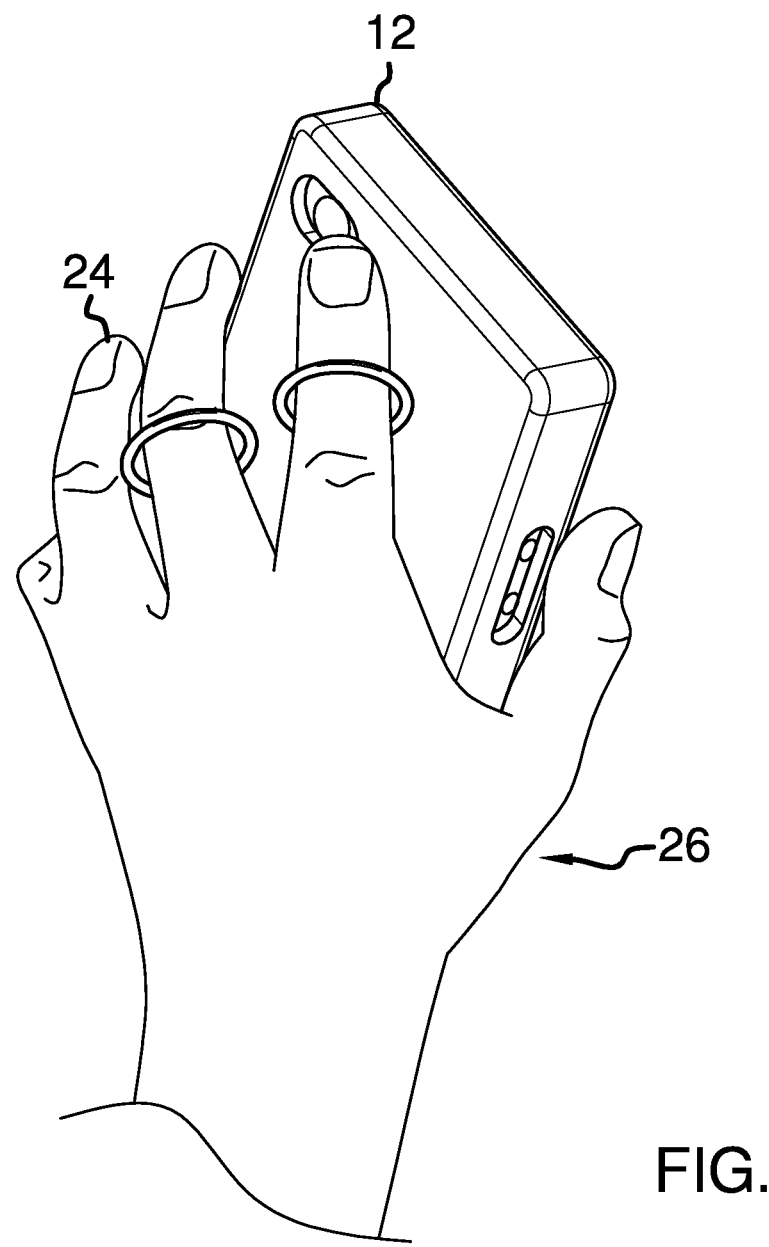
FIG. 7 is a back in-use view of an embodiment of the disclosure.

With reference now to the drawings, and in particular to FIGS. 1 through 7 thereof, a new theft prevention device embodying the principles and concepts of an embodiment of the disclosure and generally designated by the reference numeral 10 will be described.

As best illustrated in FIGS. 1 through 7, the electronic device theft prevention assembly 10 generally comprises a case 12 that may removably receive an electronic device 14. The electronic device 14 may be a smart phone or the like. The case 12 has a front side 16, a back side 18 and a perimeter edge 20 extending therebetween. The front side 16 is substantially open. The case 12 may be a smart phone case of any conventional design.

A grip 22 is coupled to the case 12. The grip 22 may be engaged by fingers 24 of a user 26 such that the case 12 is retained on the user 26. The grip 22 is comprised of a flexible material. The grip 22 comprises a mount 28 that has a back surface 30, a front surface 32 and a peripheral edge 34 extending therebetween. The mount 28 is rotatably coupled to the case 12 so the back surface 30 abuts the back side 18 of the case 12.

A pin 36 extends through the mount 28 and the case 12 such that the mount 28 is retained on the case 12. A first arm 38 and a second arm 40 are provided. Each of the first arm 38 and the second arm 40 has a first end 42 and a second end 44. The first ends 42 are each coupled to the peripheral edge 34 such that the first arm 38 and the second arms 40 each extends away from the mount 28. The first arm 38 and the second arm 40 are oriented to form a V-shape with respect to each other.

A first ring 46 and a second ring 48 are provided. The first ring 46 is coupled to the second end 44 of the first arm 38. The second ring 48 is coupled to the second end 44 of the second arm 40. Each of the first ring 46 and the second ring 48 may insertably receive the user's fingers 24 when the user 26 holds the case 12. The first ring 46 and the second ring 48 each lie on a plane that is planar with the back side 18 when the first 46 and second 48 rings are not in use.

In use, the user's fingers 24 are positioned in the first 46 and second 48 rings when the electronic device 14 is being utilized. The assembly 10 prevents the electronic device 14 from being forcibly removed from the user 26 or from being dropped.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An electronic device theft prevention assembly configured to prevent an electronic device from being taken from a user, said assembly comprising:
   a case configured to removably receive an electronic device, said case having a front side, a back side and a perimeter edge extending therebetween, said front side being substantially open; and
   a grip coupled to said case, said grip being configured to be engaged by fingers of a user such that said case is retained on the user, said grip being comprised of a flexible material;

wherein said grip comprising a mount having a back surface, a front surface and a peripheral edge extending therebetween, said mount being rotatably coupled to said case wherein said back surface abuts said back side of said case;

wherein a pin extending through said mount and said case such that said mount is retained on said case; and wherein said grip further comprising a first arm and a second arm, each of said first arm and said second arm having a first end and a second end, said first ends each being coupled to said peripheral edge such that said first arm and said second arms each extends away from said mount, said first arm and said second arm being oriented to form a V-shape with respect to each other.

2. The assembly according to claim 1, further comprising a first ring and a second ring, said first ring being coupled to said first arm, said second ring being coupled to said second arm, each of said first ring and said second ring being configured to insertably receive the user's fingers when the user holds said case, said first ring and said second ring each lying on a plane being planar with said back side when said first and second rings are not in use.

3. An electronic device theft prevention assembly configured to prevent an electronic device from being taken from a user, said assembly comprising:

a case configured to removably receive an electronic device, said case having a front side, a back side and a perimeter edge extending therebetween, said front side being substantially open;

a grip coupled to said case, said grip being configured to be engaged by fingers of a user such that said case is retained on the user, said grip being comprised of a flexible material, said grip comprising:

a mount having a back surface, a front surface and a peripheral edge extending therebetween, said mount being rotatably coupled to said case wherein said back surface abuts said back side of said case;

a pin extending through said mount and said case such that said mount is retained on said case;

a first arm and a second arm, each of said first arm and said second arm having a first end and a second end, said first ends each being coupled to said peripheral edge such that said first arm and said second arms each extends away from said mount, said first arm and said second arm being oriented to form a V-shape with respect to each other; and a first ring and a second ring, said first ring being coupled to said second end of said first arm, said second ring being coupled to said second end of said second arm, each of said first ring and said second ring being configured to insertably receive the user's fingers when the user holds said case, said first ring and said second ring each lying on a plane being planar with said back side when said first and second rings are not in use.

* * * * *